(12) United States Patent
Proctor

(10) Patent No.: US 9,348,028 B2
(45) Date of Patent: May 24, 2016

(54) SONAR MODULE USING MULTIPLE RECEIVING ELEMENTS

(71) Applicant: Navico Holding AS, Egersund (NO)

(72) Inventor: Alan Proctor, Owasso, OK (US)

(73) Assignee: NAVICO HOLDING AS, Egersund (NO)

( * ) Notice: Subject to any disclaimer, the term of this patent is extended or adjusted under 35 U.S.C. 154(b) by 259 days.

(21) Appl. No.: 13/767,612

(22) Filed: Feb. 14, 2013

(65) Prior Publication Data

US 2014/0010049 A1    Jan. 9, 2014

Related U.S. Application Data

(60) Provisional application No. 61/668,972, filed on Jul. 6, 2012.

(51) Int. Cl.
| | |
|---|---|
| *G01S 15/89* | (2006.01) |
| *G01S 15/96* | (2006.01) |
| *G01S 15/02* | (2006.01) |
| *G01S 7/521* | (2006.01) |
| *G01S 7/62* | (2006.01) |

(52) U.S. Cl.
CPC ............ *G01S 15/8902* (2013.01); *G01S 7/521* (2013.01); *G01S 15/025* (2013.01); *G01S 15/96* (2013.01); *G01S 7/6218* (2013.01)

(58) Field of Classification Search
CPC ... G01S 15/8902; G01S 15/96; G01S 15/025; G01S 7/521; G01S 7/6218
USPC .................................................. 367/88, 173
See application file for complete search history.

(56) References Cited

U.S. PATENT DOCUMENTS

| | | | |
|---|---|---|---|
| 4,829,493 A | 5/1989 | Bailey | |
| 4,879,697 A * | 11/1989 | Lowrance et al. | 367/88 |
| 5,025,423 A | 6/1991 | Earp | |
| 5,184,330 A * | 2/1993 | Adams et al. | 367/88 |
| 5,191,341 A | 3/1993 | Gouard et al. | |
| 5,537,380 A | 7/1996 | Sprankle, Jr. et al. | |
| 6,201,767 B1 * | 3/2001 | Lagace et al. | 367/173 |
| 6,225,984 B1 | 5/2001 | Crawford | |

(Continued)

OTHER PUBLICATIONS

PCT International Search Report and Written Opinion; PCT/IB2013/060285; Feb. 18, 2014.

(Continued)

*Primary Examiner* — Daniel Pihulic

(74) *Attorney, Agent, or Firm* — Nelson Mullins Riley & Scarborough LLP

(57) ABSTRACT

A sonar module using multiple receiving elements. A sonar module for use with a vessel may include a housing positioned on the vessel. The sonar module may also include one or more transmitting elements positioned inside the housing and configured to send at least one transmit signal to a transducer array. The sonar module may further include a first receiving element, a second receiving element, a third receiving element, and a fourth receiving element positioned inside the housing, where the first receiving element is configured to receive a first sonar data from the transducer array, the second receiving element is configured to receive a second sonar data from the transducer array, the third receiving element is configured to receive a third sonar data from the transducer array, and the fourth receiving element is configured to receive a fourth sonar data from the transducer array.

17 Claims, 4 Drawing Sheets

(56) References Cited

U.S. PATENT DOCUMENTS

| | | | |
|---|---|---|---|
| 6,321,158 B1 | 11/2001 | DeLorme et al. | |
| 6,411,283 B1 | 6/2002 | Murphy | |
| 6,418,080 B2 | 7/2002 | Inouchi | |
| 6,421,299 B1 | 7/2002 | Betts et al. | |
| 6,761,692 B2 | 7/2004 | Angelsen et al. | |
| 6,816,782 B1 | 11/2004 | Walters et al. | |
| 7,002,579 B2 | 2/2006 | Olson | |
| 7,236,426 B2 | 6/2007 | Turner et al. | |
| 7,430,461 B1 | 9/2008 | Michaels | |
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 7,812,667 B2 | 10/2010 | Fagg | |
| 7,870,496 B1 | 1/2011 | Sherwani | |
| 7,890,867 B1 | 2/2011 | Margulis | |
| 8,019,532 B2 | 9/2011 | Sheha et al. | |
| 8,063,540 B2 | 11/2011 | Angelsen et al. | |
| 8,300,499 B2 * | 10/2012 | Coleman et al. | 367/88 |
| 8,305,840 B2 * | 11/2012 | Maguire | 367/88 |
| 2002/0035574 A1 | 3/2002 | Dumas | |
| 2002/0093541 A1 | 7/2002 | Schileru-Key | |
| 2004/0193364 A1 | 9/2004 | Chojnacki | |
| 2005/0102101 A1 | 5/2005 | Beesley et al. | |
| 2006/0013066 A1 | 1/2006 | Nishimori et al. | |
| 2006/0119585 A1 | 6/2006 | Skinner | |
| 2006/0224940 A1 | 10/2006 | Lee | |
| 2008/0126935 A1 | 5/2008 | Blomgren | |
| 2008/0204424 A1 | 8/2008 | Jin et al. | |
| 2009/0064055 A1 | 3/2009 | Chaudhri et al. | |
| 2009/0099871 A1 | 4/2009 | Gadodia | |
| 2009/0179789 A1 | 7/2009 | Haughay, Jr. et al. | |
| 2009/0249247 A1 | 10/2009 | Tseng et al. | |
| 2009/0287409 A1 | 11/2009 | Summers | |
| 2010/0080082 A1 | 4/2010 | Betts et al. | |
| 2010/0145601 A1 | 6/2010 | Kurtti et al. | |
| 2010/0199225 A1 | 8/2010 | Coleman et al. | |
| 2010/0226203 A1 | 9/2010 | Buttle et al. | |
| 2010/0250122 A1 | 9/2010 | Kubota et al. | |
| 2011/0013484 A1 | 1/2011 | Coleman et al. | |
| 2011/0013485 A1 | 1/2011 | Maguire | |
| 2011/0019887 A1 | 1/2011 | Roehrig et al. | |
| 2011/0025720 A1 | 2/2011 | Jo et al. | |
| 2011/0154183 A1 | 6/2011 | Burns et al. | |
| 2012/0001773 A1 | 1/2012 | Lyons et al. | |
| 2012/0011437 A1 | 1/2012 | James et al. | |
| 2012/0014220 A1 | 1/2012 | DePasqua | |
| 2012/0069712 A1 | 3/2012 | Potanin et al. | |
| 2012/0106300 A1 | 5/2012 | Maguire | |
| 2012/0163126 A1 * | 6/2012 | Campbell et al. | 367/135 |
| 2012/0185801 A1 | 7/2012 | Madonna et al. | |
| 2012/0281507 A1 * | 11/2012 | Rikoski | 367/88 |
| 2013/0007665 A1 | 1/2013 | Chaudhri et al. | |
| 2013/0208568 A1 * | 8/2013 | Coleman | 367/88 |
| 2014/0010048 A1 * | 1/2014 | Proctor | 367/88 |
| 2014/0010049 A1 * | 1/2014 | Proctor | 367/88 |
| 2014/0269163 A1 * | 9/2014 | Proctor | 367/7 |
| 2014/0269192 A1 * | 9/2014 | Proctor | 367/88 |

OTHER PUBLICATIONS

PCT International Search Report and Written Opinion; PCT/US2013/047869; Oct. 21, 2013.

PCT International Search Report and Written Opinion; PCT/US2013/048177; Oct. 21, 2013.

PCT International Search Report and Written Opinion; PCT/US2013/048129; Oct. 17, 2013.

PCT International Search Report and Written Opinion; PCT/US2013/047926; Oct. 11, 2013.

PCT International Search Report and Written Opinion; PCT/US2013/047645; Sep. 27, 2013.

* cited by examiner

SONAR MODULE USING MULTIPLE RECEIVING ELEMENTS

CROSS-REFERENCE TO RELATED APPLICATIONS

This application claims benefit of U.S. provisional patent application Ser. No. 61/668,972, filed Jul. 6, 2012 and titled FOUR SONAR CHANNELS IN ONE HEAD UNIT, the entire disclosure of which is herein incorporated by reference.

BACKGROUND

The following descriptions and examples do not constitute an admission as prior art by virtue of their inclusion within this section.

Sonar has been used to detect waterborne or underwater objects. For example, sonar devices may be used to determine depth and bottom topography, detect fish or other waterborne contacts, or locate wreckage. Devices such as transducer elements, or transducers, have been developed to produce sound at a particular frequency. These transducer elements may transmit the sound into and through the water, and they may also detect echo returns from sound that return to the transducer elements after reflecting off of an object.

Transducer elements may convert an electrical signal into sound energy and, conversely, may convert sound energy, detected via pressure changes, into an electrical signal. In operation, a transducer element may produce a sound pressure signal which emanates in a beam pattern such that a pressure wave is generated, where the pressure wave expands as it moves away from the source. Reflected sound may then return to the transducer element in the form of a sonar return signal, where the sonar return signal may be interpreted as a surface of an object. Such transducer elements may be directed in various directions from surface or submersible vessels to locate other vessels, or the transducer elements may be directed towards the seabed for navigation and/or target location. Display technology may also be utilized in the interpretation of sonar data representing the sonar return signals, such as through liquid crystal displays (LCDs) or other digital displays.

SUMMARY

Described herein are implementations of various technologies for a sonar module using multiple receiving elements. In one implementation, a sonar module for use with a vessel may include a housing positioned on the vessel. The sonar module may also include one or more transmitting elements positioned inside the housing and configured to send at least one transmit signal to a transducer array. The sonar module may further include a first receiving element, a second receiving element, a third receiving element, and a fourth receiving element positioned inside the housing, where the first receiving element is configured to receive a first sonar data from the transducer array, the second receiving element is configured to receive a second sonar data from the transducer array, the third receiving element is configured to receive a third sonar data from the transducer array, and the fourth receiving element is configured to receive a fourth sonar data from the transducer array.

In another implementation, a sonar system for use with a vessel may include a sonar module. The sonar module may include a housing positioned on the vessel. The sonar module may also include one or more transmitting elements positioned inside the housing and configured to send at least one transmit signal to a transducer array. The sonar module may further include a first receiving element, a second receiving element, a third receiving element, and a fourth receiving element positioned inside the housing, where the first receiving element is configured to receive a first sonar data from the transducer array, the second receiving element is configured to receive a second sonar data from the transducer array, the third receiving element is configured to receive a third sonar data from the transducer array, and the fourth receiving element is configured to receive a fourth sonar data from the transducer array. The transducer array may be in communication with the sonar module and may be configured to (i) receive the at least one transmit signal from the one or more transmitting elements, (ii) produce one or more sonar beams based on the at least one transmit signal, and (iii) receive one or more sonar return signals from an underwater environment.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
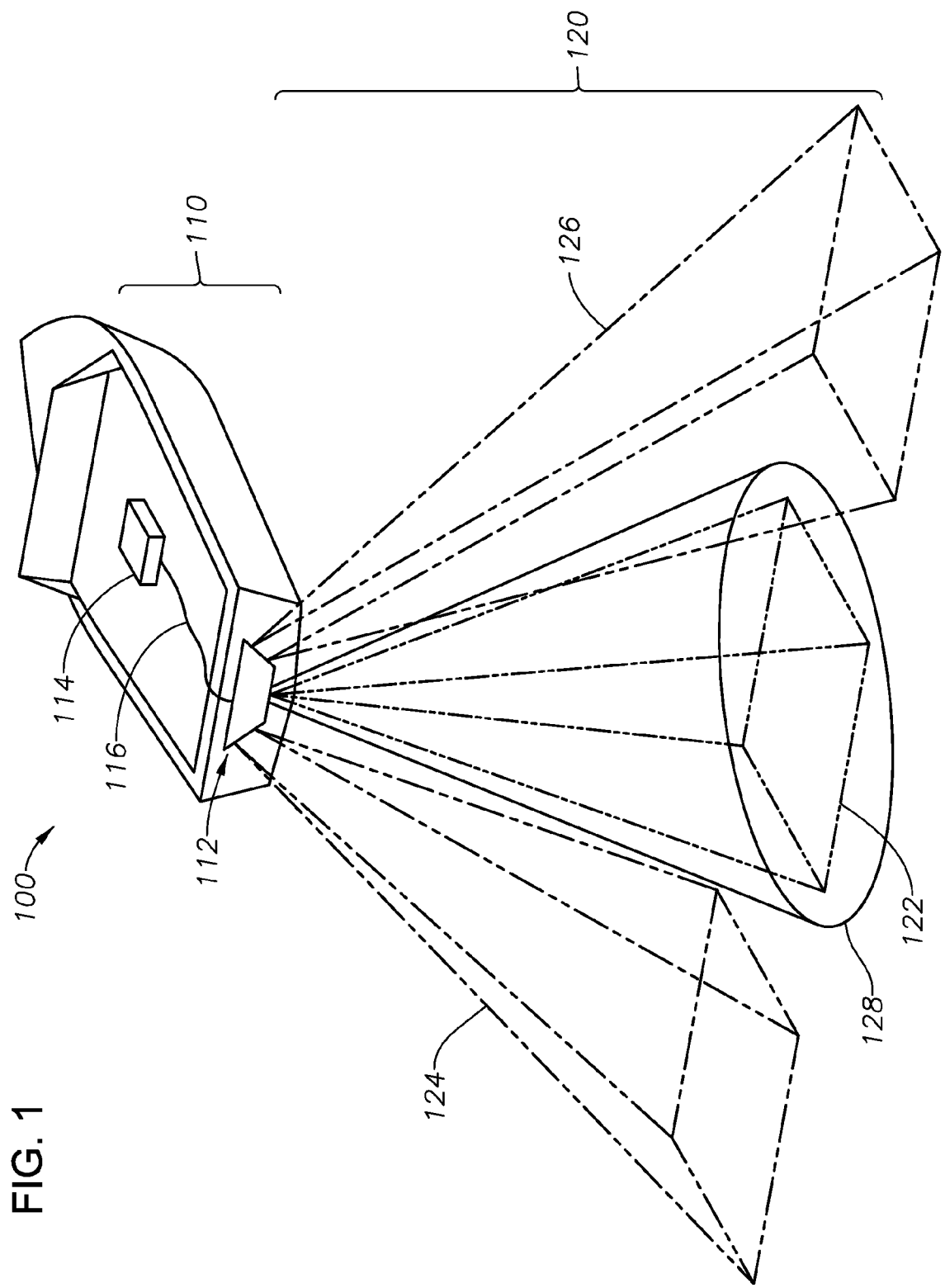
FIG. 1 illustrates a vessel having a sonar system in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

The following paragraphs provide a brief summary of various technologies and techniques directed at a sonar module using multiple receiving elements described herein.

A sonar system may be positioned, coupled, or mounted to a vessel and may be configured to identify objects in water to either side of and/or below the vessel. The sonar system may include a transducer array coupled to a sonar module. The sonar module may be communicably coupled to the transducer array, where the sonar signal processor of the sonar module may be configured to process data received from the transducer array.

The sonar module may include a display element, a user interface, a network hub, and a sonar signal processor. The sonar module may be placed, coupled, or mounted in the vessel. In one implementation, the sonar module may be mounted on a dashboard of the vessel. The sonar module may also be implemented in a single housing.

The sonar module may include at least four receiving elements for receiving sonar data from the transducer array. For example, the sonar module may include a left receiving element, a down receiving element, a sonar receiving element, and a right receiving element. The sonar module may also include one or more transmitting elements to transmit one or more transmit signals to the transducer array. For example, the sonar module may include a down transmitting element and a sonar transmitting element, and it may also include a down transmit/receive (T/R) switch and a sonar T/R switch.

The down transmitting element may be configured to send a down transmit signal from the sonar signal processor to the transducer array. In addition, the sonar transmitting element may be configured to send a sonar transmit signal from the sonar signal processor to the transducer array. The left receiving element, the down receiving element, the sonar receiving element, and the right receiving element may each be configured to receive respective sonar data from the transducer array. In one implementation, the left receiving element, the down receiving element, the sonar receiving element, and the right receiving element may each be configured to filter its received sonar data based on a specified frequency.

In addition, the left receiving element, the down receiving element, the sonar receiving element, and the right receiving element may each be configured to send its respective filtered sonar data to the sonar signal processor. In one implementation, the filtered sonar data may be displayed using the display element after being received from the sonar signal processor. In sum, implementing the sonar module with the at least four receiving elements in the single housing may alleviate space concerns, in particular when compared with implementing the sonar module in multiple housings.

Various implementations of a sonar module using multiple receiving elements described above will now be described in more detail with reference to FIGS. 1-5.

Sonar System

FIG. 1 illustrates a vessel 100 having a sonar system 110 in accordance with implementations of various techniques described herein. The sonar system 110 may be positioned, coupled, or mounted to the vessel 100 and may be configured to identify objects in water to either side of and/or below the vessel 100. The vessel 100 may be a surface water vehicle, a submersible water vehicle, or any other implementation known to those skilled in the art.

The sonar system 110 may include a transducer array 112 coupled to a sonar module 114. In one implementation, the transducer array 112 may be coupled to the sonar module 114 via a communication cable 116. The sonar module 114 may be configured to process data received from the transducer array 112 through the communication cable 116. The transducer array 112 may include a plurality of transducer elements configured to produce one or more sonar beams 120 which provide substantially continuous sonar coverage from one side of the vessel 100 to an opposite side of the vessel 100. As illustrated in FIG. 1, sonar beams 120 may include sonar beam 122, sonar beam 124, sonar beam 126, and sonar beam 128.

The transducer array 112 may receive one or more transmit signals from the sonar module 114, and, in response, produce one or more sound pressure signals which emanate as one or more sonar beams 120. In one implementation, the transmit signal may be an electrical signal used by the transducer array 112 to produce the sonar beams 120. Reflected sound may then return to the transducer array 112 in the form of one or more sonar return signals, where the sonar return signals may include details about an area of water proximate to the sides and/or the bottom of the vessel 100. In turn, the transducer array 112 may convert the sonar return signals into sonar data to be sent to the sonar module 114, where the sonar data may be one or more electrical signals which may be representative of the sonar return signals.

In one implementation, the transducer array 112 may include a circular transducer element which produces a conical sonar beam, such as sonar beam 128, with the conical sonar beam having an apex located at the circular transducer element. In another implementation, the transducer array 112 may include a linear transducer element which produces a planar fan-shaped sonar beam, such as either sonar beam 122, sonar beam 124, or sonar beam 126, where the sonar beam may be relatively narrow in beamwidth in a direction parallel to a keel of the vessel 100 and relatively wide in beamwidth in a direction perpendicular to the keel of the vessel 100.

Figure 2:
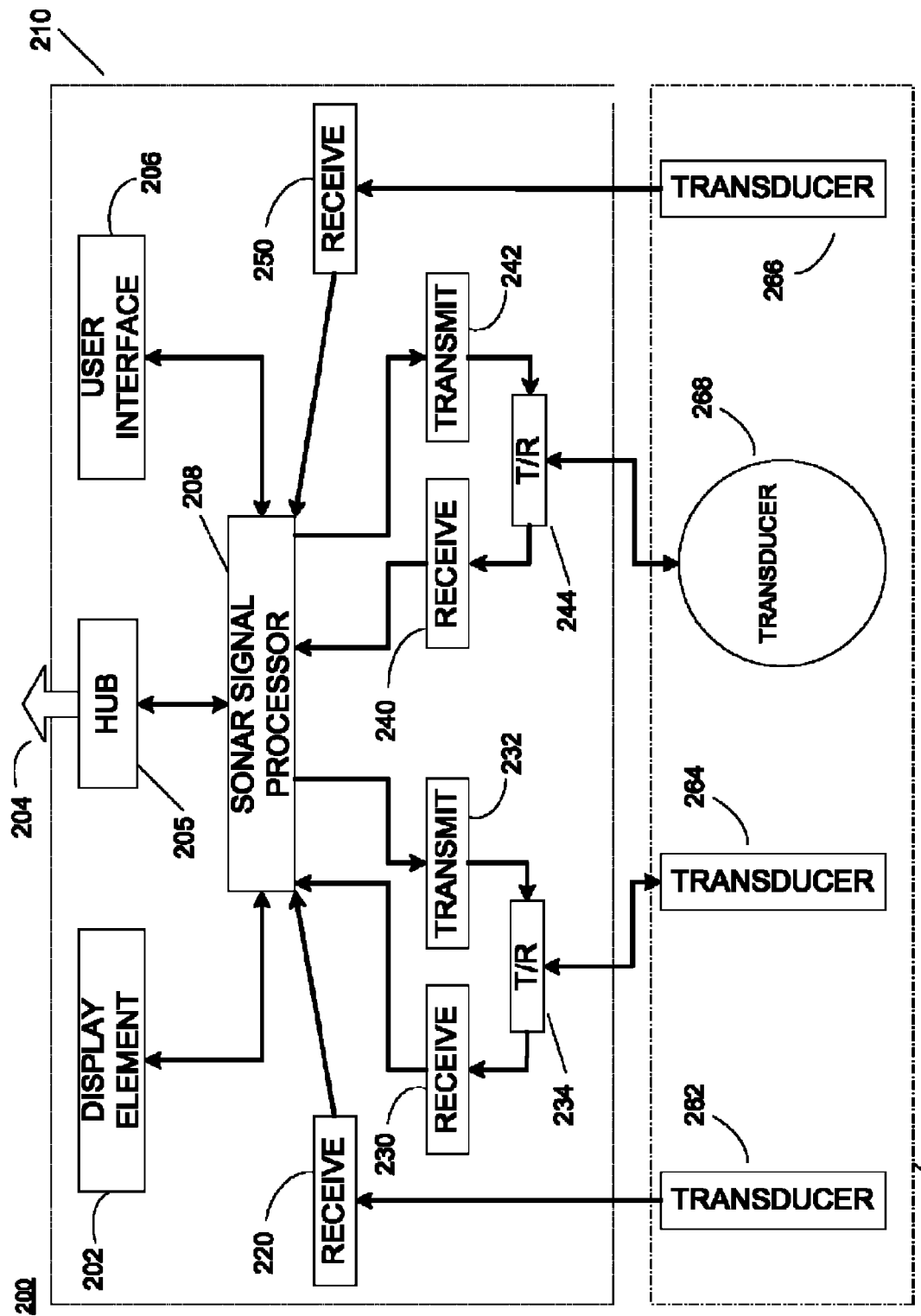
FIG. 2 illustrates a block diagram of a sonar system in accordance with implementations of various techniques described herein.

FIG. 2 illustrates a block diagram of a sonar system 200 in accordance with implementations of various techniques described herein. The sonar system 200 may include various components, which may include means embodied in hardware and/or software configured to perform one or more corresponding functions. For example, in one implementation, components of the sonar system 200 may include a sonar module 210 and a transducer array 260. The sonar system 200 may be similar to the first sonar system 110, the sonar module 210 may be similar to the sonar module 114, and the transducer array 260 may be similar to the transducer array 112. Further, the sonar module 210 may include a display element 202, a user interface 206, a network hub 205, and a sonar signal processor 208.

Sonar Module

The sonar module 210 may be placed, coupled, or mounted in the vessel. In one implementation, the sonar module 210 may be a mobile device configured to be placed anywhere in the vessel. In one implementation, the sonar module 210 may be mounted on a dashboard of the vessel. The sonar module 210 may be communicably coupled to the transducer array 260, where the sonar signal processor 208 may be configured to process data received from the transducer array 260. In one implementation, the transducer array 260 may be coupled to the sonar module 210 via a communication cable (not pictured). The sonar module 210 may be implemented in a single housing.

The display element 202, the user interface 206, and/or the network hub 205 may be configured to communicate with the sonar signal processor 208. In one implementation, the display element 202 and the user interface 206 may communicate with one another via the sonar signal processor 208. In another implementation, the user interface 206 may be integrated into the display element 202. The network hub 205 may include one or more interface ports to allow components to communicate with a network 204, which may include Ethernet or any other network implementation known to those skilled in the art. In one implementation, the network hub 205 may be configured to transmit data to other components and/or devices via the network 204.

The display element 202 may be configured to display images, where it may receive data from the sonar signal processor 208 and render the data into one or more windows on the display element 202. For example, the display element 202 may include a liquid crystal display (LCD) screen, a touch screen display, or any other implementation known to those skilled in the art. In one implementation, the display element 202 may include two or more displays. The display element 202 may be configured to display sonar data, radar data, chart data, or the like. A user may interact with the sonar system 200 through the user interface 206. The user interface 206 may include, for example, a keyboard, keypad, function keys, mouse, scrolling device, input/output ports, touch screen, or any other user interface known to those skilled in the art.

The sonar signal processor 208 may be any device or circuitry operating in accordance with hardware and/or software and may be configured to perform various functions described herein. In some implementations, the sonar signal processor 208 may include a processor, a processing element, a coprocessor, a controller, an application specific integrated circuit (ASIC), a field programmable gate array (FPGA), a hardware accelerator, or any other implementation known to those skilled in the art, where the sonar signal processor 208 is configured to execute various programmed operations or instructions stored in a memory device. The sonar signal processor 208 may further include multiple compatible additional hardware and/or software items configured to: (i) implement signal processing or enhancement features to improve display characteristics, data, and/or images, (ii) collect or process additional data, such as time, temperature, global positioning system (GPS) information, and/or waypoint designations, or (iii) filter extraneous data to better analyze the collected data. The sonar signal processor 208 may further implement notices and alarms, such as those determined or adjusted by a user, to reflect depth, presence of fish, and/or proximity of other watercraft. Still further, the sonar signal processor 208, in combination with suitable memory, may store incoming data from the transducer array 260, screen images for future playback, transfer and/or alter images with additional processing to implement zoom or lateral movement, or correlate data such as fish or bottom features to a GPS position or temperature.

The sonar module 210 may include at least four receiving elements for receiving sonar data from the transducer array 260. For example, the sonar module 210 may include a left receiving element 220, a down receiving element 230, a sonar receiving element 240, and a right receiving element 250. The sonar module 210 may also include one or more transmitting elements to transmit one or more transmit signals to the transducer array 260. For example, the sonar module 210 may include a down transmitting element 232 and a sonar transmitting element 242, and it may also include a down transmit/receive (T/R) switch 234 and a sonar T/R switch 244. The left receiving element 220, the down receiving element 230, the sonar receiving element 240, the right receiving element 250, the down transmitting element 232, the sonar transmitting element 242, the down T/R switch 234, and the sonar T/R switch 244 may each be any device or circuitry operating in accordance with hardware and/or software configured to perform their respective functions as described herein.

The down transmitting element 232 may be configured to send a down transmit signal from the sonar signal processor 208 to the transducer array 260. In addition, the sonar transmitting element 242 may be configured to send a sonar transmit signal from the sonar signal processor 208 to the transducer array 260. The down transmitting element 232 and the sonar transmitting element 242 may each be a transmitter, a transceiver, or any other implementation known to those skilled in the art. In another implementation, a frequency of the down transmit signal and/or the sonar transmit signal may range from about 40 kilohertz (kHz) to about 850 kHz, and they may be implemented using any waveform known to those skilled in the art.

In one implementation, the down transmit signal and/or the sonar transmit signal may each be a frequency burst signal, such that each signal may be composed of a sequence of bursts. In particular, each burst of the down transmit signal and/or the sonar transmit signal may be composed of signal pulses of two or more frequencies. For example, each burst of the down transmit signal may include a first portion having a first frequency and a second portion having a second frequency, where the first frequency and second frequency are different. In one implementation, the first portion may be of a different duration of time (e.g., shorter) than the second portion. The bursts may be implemented using any waveform known to those skilled in the art.

The left receiving element 220, the down receiving element 230, the sonar receiving element 240, and the right receiving element 250 may each be configured to receive respective sonar data from the transducer array 260. The left receiving element 220, the down receiving element 230, the sonar receiving element 240, and the right receiving element 250 may each be a receiver, a transceiver, or any other implementation known to those skilled in the art. In one implementation, the left receiving element 220, the down receiving element 230, the sonar receiving element 240, and the right receiving element 250 may each be configured to filter its received sonar data based on a specified frequency.

In addition, the left receiving element 220, the down receiving element 230, the sonar receiving element 240, and the right receiving element 250 may each be configured to send its respective filtered sonar data to the sonar signal processor 208. In one implementation, the filtered sonar data may be displayed using the display element 202 after being received from the sonar signal processor 208. In another implementation, the down T/R switch 234 may be used to alternate between sending the down transmit signal to the transducer array 260 or sending respective sonar data to the down receiving element 230. Likewise, the sonar T/R switch 244 may be used to alternate between sending the sonar transmit signal to the transducer array 260 or sending respective sonar data to the sonar receiving element 240.

Transducer Array

The transducer array 260 may be disposed in one or more housings that are positioned on, or placed proximate to, the vessel employing the sonar system 200. In one implementation, the transducer array 260 may be disposed in one or more housings that are flexibly mounted to one or more positions along a hull of the vessel. In another implementation, the transducer array 260 may be mounted onto another device or component attached to the hull, such as a trolling motor or other steerable device. In yet another implementation, the transducer array 260 and the sonar module 210 may be placed in the same housing.

The transducer array 260 may include a plurality of transducer elements, where the transducer elements may include one or more circular transducer elements, one or more linear transducer elements, or any other transducer element known to those skilled in the art. The transducer elements may be substantially identical in terms of construction and/or geometrical dimensions, while also differing in terms of orientation and/or usage. The transducer elements may be constructed using piezoelectric material. In one implementation, the transducer array 260 may include a left transducer element 262, a down transducer element 264, a right transducer element 266, and a sonar transducer element 268.

The left transducer element 262, the down transducer element 264, and the right transducer element 266 may each be a linear transducer element, such that each may be substantially rectangular in shape. The left transducer element 262, the down transducer element 264, and the right transducer element 266 may be employed in a sidescan sonar configuration to identify objects in water below and to either side of the vessel. In addition, the sonar transducer element 268 may be a circular transducer element, such that it may be substantially cylindrical in shape.

Figure 3:
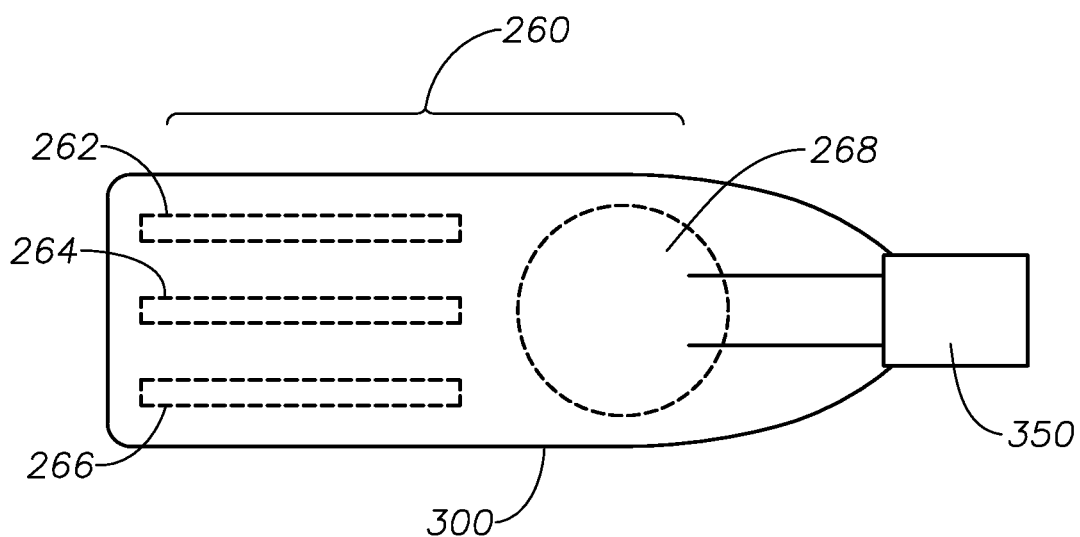
FIG. 3 illustrates a top view of a transducer array disposed in a housing in accordance with implementations of various techniques described herein.
Figure 4:
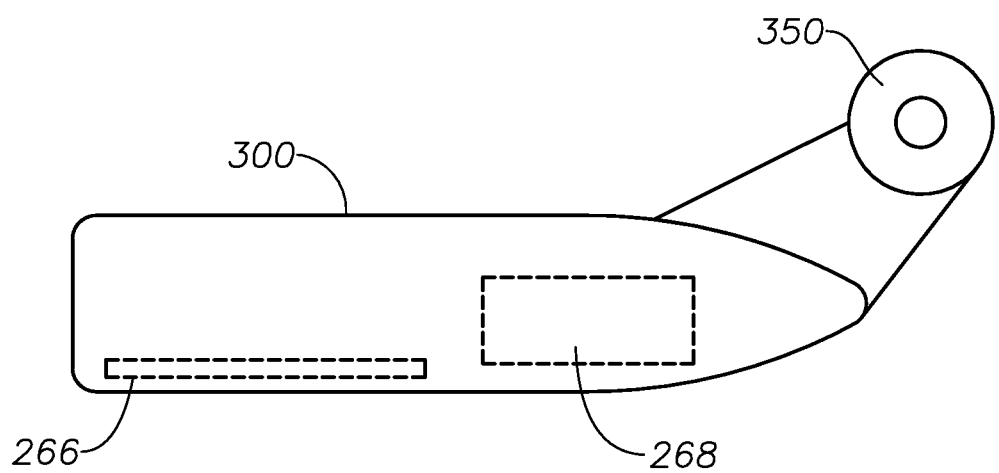
FIG. 4 illustrates a cross-sectional side view of a transducer array disposed in a housing in accordance with implementations of various techniques described herein.
Figure 5:
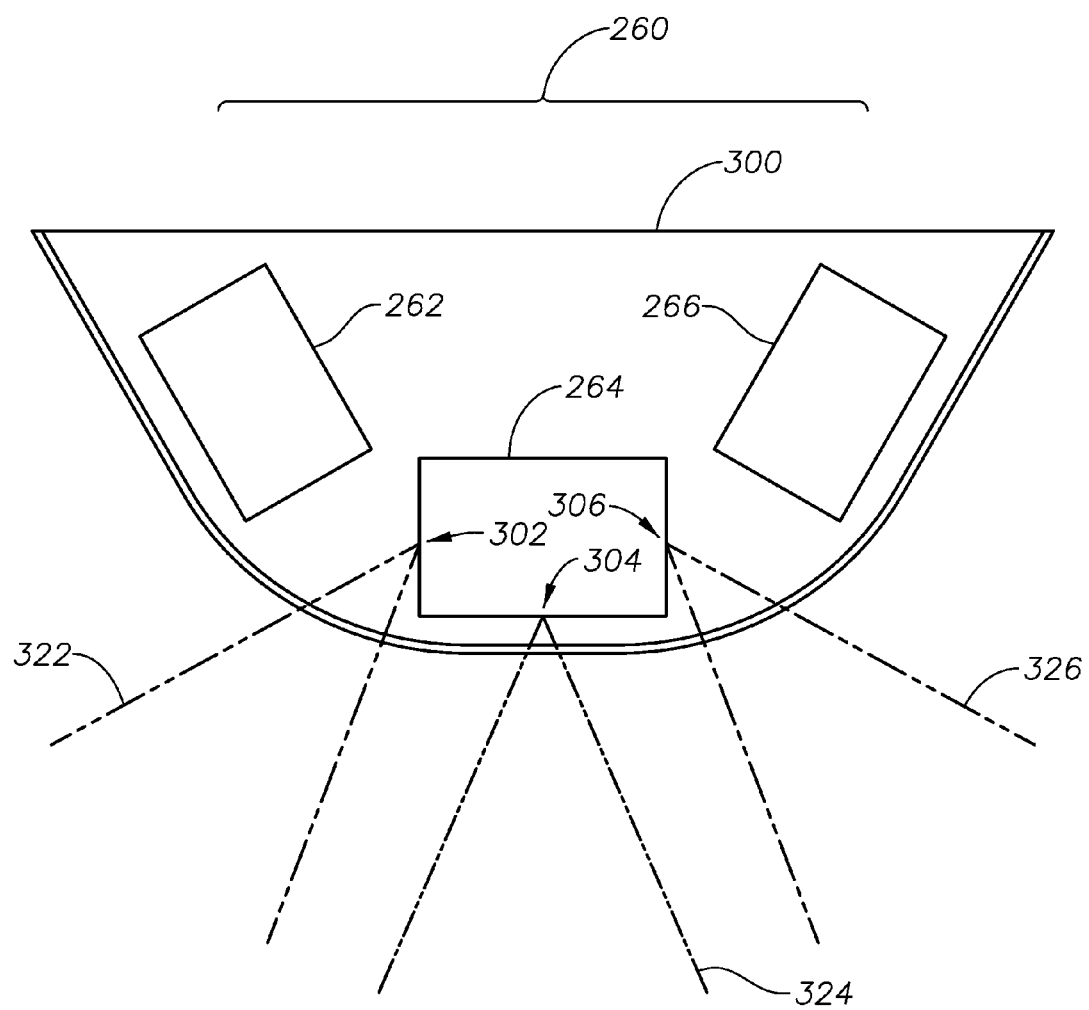
FIG. 5 illustrates a cross-sectional rear view of a transducer array disposed in a housing in accordance with implementations of various techniques described herein.

One configuration of the transducer array 260 is illustrated in FIGS. 3, 4, and 5. FIG. 3 illustrates a top view of the transducer array 260 disposed in a housing 300 in accordance with implementations of various techniques described herein. FIG. 4 illustrates a cross-sectional side view of the transducer array 260 disposed in the housing 300 in accordance with implementations of various techniques described herein. In such a configuration, the housing 300 may be mounted to the hull of the vessel using a mounting device 350, such that the left transducer element 262, the down transducer element 264, and the right transducer element 266 may be oriented closer to the rear of the vessel in comparison to the sonar transducer element 268. FIG. 5 illustrates a cross-sectional rear view of the transducer array 260 disposed in the housing 300 mounted to the vessel in accordance with implementations of various techniques described herein, such that sonar transducer element 268 may not be visible in FIG. 5.

In one implementation, the down transducer element 264 may receive the down transmit signal from the transmitting element 232, and, in response, produce one or more sonar beams through areas of water proximate to the sides of and/or below the vessel. For example, a left face 302 of the down transducer element 264 may produce a sonar beam 322 directed to an area of water proximate to and/or below a left side of the vessel. A down face 304 of the down transducer element 264 may also produce a sonar beam 324 directed to a water column substantially below the vessel. Further, a right face 306 of the down transducer element 264 may produce a sonar beam 326 directed to an area of water proximate to and/or below a right side of the vessel. In addition, the left transducer element 262 and the right transducer element 266 may not produce sonar beams. The sonar beams 322, 324, and 326 may each also be a planar fan-shaped sonar beam, such that it may be relatively narrow in beamwidth in a direction parallel to a keel of the vessel and relatively wide in beamwidth in a direction perpendicular to the keel of the vessel.

Further, the sonar transducer element 268 may receive the sonar transmit signal from the sonar transmitting element 242, and, in response, produce one or more sonar beams through areas of water proximate to the sides of and/or below the vessel. For example, the sonar transducer element 268 may produce a conical sonar beam, with the conical sonar beam having an apex located at the sonar transducer element 268. The sonar beams produced by the sonar transducer element 268 may be directed in a substantially downward direction from the vessel.

The down transducer element 264 and the sonar transducer element 268 may insonify areas of water proximate to the sides of and/or below the vessel, whereby their sonar beams provide substantially continuous sonar coverage from one side of the vessel to an opposite side of the vessel. The sonar beams produced by the transducer array 260 may also at least partially overlap in coverage. In one implementation, an acoustic shield may be applied to the sonar transducer element 268 and/or the down transducer element 264 to produce the sonar beams in desired directions in the areas of water proximate to the sides of and/or below the vessel.

The left transducer element 262, the down transducer element 264, the right transducer element 266, and the sonar transducer element 268 may each be configured to receive respective sonar return signals from respective areas of water proximate to and/or below the vessel. For example, the left transducer element 262 may be positioned on a left side of the housing 300 to receive sonar return signals from the area of water proximate to and/or below the left side of the vessel. The right transducer element 266 may be positioned on a right side of the housing 300 to receive sonar return signals from the area of water proximate to and/or below the right side of the vessel. The down transducer element 264 may be positioned substantially between the left transducer element 262 and the right transducer element 266 in the housing 300 to receive sonar return signals from the water column substantially below the vessel. The sonar transducer element 268 may receive sonar return signals from an area of water below a down side of the vessel in response to its conical sonar beam. In one implementation, an acoustic shield may be applied to the transducer elements such that the transducer elements receive respective sonar return signals from respective desired areas of water.

The left transducer element 262, the down transducer element 264, the right transducer element 266, and the sonar transducer element 268 may each be configured to also send respective sonar data to the sonar module 210, where the respective sonar data may be representative of respective sonar return signals. For example, the left transducer element 262 may convert its sonar return signals into left sonar data to be sent to the left receiving element 220. The down transducer element 264 may convert its sonar return signals into down sonar data to be sent to the down receiving element 230. The right transducer element 266 may convert its sonar return signals into right sonar data to be sent to the right receiving element 250. In addition, the sonar transducer element 268 may convert its sonar return signals into conical sonar data to be sent to the sonar receiving element 240.

As mentioned previously, the left receiving element 220, the down receiving element 230, the sonar receiving element 240, and the right receiving element 250 may each filter its received sonar data based on a respective specified frequency and send its filtered sonar data to the sonar signal processor 208. The filtered sonar data may then be displayed using the display element 202. In sum, implementing the sonar module with the at least four receiving elements in the single housing may alleviate space concerns, in particular when compared with implementing the sonar module in multiple housings.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A sonar module for use with a vessel, comprising:
   a housing disposed within the vessel;
   a first transmitting element positioned within the housing and configured to send a first transmit signal to a linear transducer element of a transducer array, the linear transducer element being configured to produce sonar beams via a down face, a left face, and a right face of the linear transducer element;
   a second transmitting element positioned within the housing and configured to send a second transmit signal to a circular transducer element of the transducer array; and
   a first receiving element, a second receiving element, a third receiving element, and a fourth receiving element positioned inside the housing, wherein the first receiving element is configured to receive a first sonar data from the transducer array, the second receiving element is configured to receive a second sonar data from the transducer array, the third receiving element is configured to receive a third sonar data from the transducer array, and the fourth receiving element is configured to receive a fourth sonar data from the transducer array.

2. The sonar module of claim 1, wherein the first transmit signal comprises one or more bursts, and wherein at least one burst comprises a first portion having a first frequency and a second portion having a second frequency different than the first frequency.

3. The sonar module of claim 1, further comprising:
   a sonar signal processor positioned inside the housing and configured to process the first sonar data, the second sonar data, the third sonar data, and the fourth sonar data; and
   a display element positioned inside the housing and configured to display images of the processed first sonar data, the processed second sonar data, the processed third sonar data, and the processed fourth sonar data.

4. The sonar module of claim 1, wherein a frequency of the first transmit signal is selected from between about 40 kilohertz (kHz) to about 850 kHz.

5. The sonar module of claim 1, wherein the first receiving element is configured to filter the first sonar data, wherein the second receiving element is configured to filter the second sonar data, wherein the third receiving element is configured to filter the third sonar data, and wherein the fourth receiving element is configured to filter the fourth sonar data.

6. A sonar system for use with a vessel, comprising:
   a sonar module, comprising:
      a housing disposed within the vessel;
      a first transmitting element positioned within the housing and configured to send a first transmit signal to a linear transducer element of a transducer array, the linear transducer element being configured to produce sonar beams via a down face, a left face, and a right face of the linear transducer element;
      a second transmitting element positioned within the housing and configured to send a second transmit signal to a circular transducer element of the transducer array; and
      a first receiving element, a second receiving element, a third receiving element, and a fourth receiving element positioned inside the housing, wherein the first receiving element is configured to receive a first sonar data from the transducer array, the second receiving element is configured to receive a second sonar data from the transducer array, the third receiving element is configured to receive a third sonar data from the transducer array, and the fourth receiving element is configured to receive a fourth sonar data from the transducer array;

wherein the transducer array is in communication with the sonar module and is configured to:
receive the first transmit signal from the first transmitting element;
produce one or more sonar beams based on the first signal; and
receive one or more sonar return signals from an underwater environment.

7. The sonar system of claim 6, wherein the transducer array comprises:
the linear transducer element configured to (i) receive the first transmit signal from the first transmitting element, (ii) produce the sonar beams based on the first transmit signal, and (iii) receive a first sonar return signal from an area of water proximate a first side of the vessel;
a second transducer element configured to receive a second sonar return signal from an area of water proximate a second side of the vessel;
a third transducer element configured to receive a third sonar return signal from an area of water proximate a third side of the vessel; and
a circular transducer element configured to (i) receive the second transmit signal from the second transmitting element, (ii) produce sonar beams based on the second transmit signal, and (iii) receive a fourth sonar return signal from an area of water proximate a fourth side of the vessel.

8. The sonar system of claim 7, wherein the second transducer element and the third transducer element each comprise a linear transducer element.

9. The sonar system of claim 7, wherein the first side of the vessel is a down side of the vessel, the second side of the vessel is a right side of the vessel, the third side of the vessel is a left side of the vessel, and the fourth side of the vessel is the down side of the vessel.

10. The sonar system of claim 7, wherein the linear transducer element is configured to convert the first sonar return signal to the first sonar data, wherein the second transducer element is configured to convert the second sonar return signal to the second sonar data, wherein the third transducer element is configured to convert the third sonar return signal to the third sonar data, and the fourth transducer element is configured to convert the fourth sonar return signal to the fourth sonar data.

11. The sonar system of claim 6, wherein the sonar module further comprises:
a sonar signal processor positioned inside the housing and configured to process the first sonar data, the second sonar data, the third sonar data, and the fourth sonar data; and
a display element positioned inside the housing and configured to display images of the processed first sonar data, the processed second sonar data, the processed third sonar data, and the processed fourth sonar data.

12. The sonar system of claim 6, wherein the first receiving element is configured to filter the first sonar data, wherein the second receiving element is configured to filter the second sonar data, wherein the third receiving element is configured to filter the third sonar data, and wherein the fourth receiving element is configured to filter the fourth sonar data.

13. The sonar system of claim 6, wherein a frequency of the first transmit signal is selected from between about 40 kilohertz (kHz) to about 850 kHz.

14. The sonar system of claim 6, wherein the first transmit signal comprises one or more bursts, and wherein at least one burst comprises a first portion having a first frequency and a second portion having a second frequency different than the first frequency.

15. A sonar module for use with a vessel, comprising:
a housing disposed within the vessel;
a plurality of receiving elements comprising a first receiving element, a second receiving element, a third receiving element, and a fourth receiving element positioned inside the housing;
one or more transmitting elements positioned inside the housing and configured to send at least one transmit signal to a transducer array;
wherein the first receiving element comprises a receiver that is configured to only receive a first sonar data from a first transducer element of the transducer array, the second receiving element is configured to receive a second sonar data from a second transducer element of the transducer array, the third receiving element comprises a receiver that is configured to only receive a third sonar data from a third transducer element of the transducer array, and the fourth receiving element is configured to receive a fourth sonar data from a fourth transducer element of the transducer array;
wherein the first transducer element comprises a left transducer element, the second transducer element comprises a down transducer element, the third transducer element comprises a right transducer element, and the fourth transducer element comprises a circular transducer element;
wherein the left transducer element is configured to only receive the first sonar data, the right transducer element is configured to only receive the third sonar data, the down transducer element is configured to produce first sonar beams and receive the second sonar data, and the circular transducer element is configured to produce second sonar beams and receive the fourth sonar data;
a first switch positioned inside the housing that alternates between sending the first sonar beams and receiving the second sonar data; and
a second switch positioned inside the housing that alternates between sending the second sonar beams and receiving the fourth sonar data.

16. The sonar module of claim 1, wherein the first sonar data, the second sonar data, and the third sonar data are received from linear transducer elements of the transducer array, and wherein the fourth sonar data is received from the circular transducer element of the transducer array.

17. The sonar module of claim 16, wherein the first sonar data corresponds to an area of water proximate a left side of the vessel, the second sonar data corresponds to an area of water proximate a down side of the vessel, the third sonar data corresponds to an area of water proximate a right side of the vessel, and the fourth sonar data corresponds to an area of water proximate the down side of the vessel.

* * * * *